US007447932B2

(12) United States Patent
Ichien et al.

(10) Patent No.: US 7,447,932 B2
(45) Date of Patent: Nov. 4, 2008

(54) SEMICONDUCTOR DATA PROCESSING DEVICE AND DATA PROCESSING SYSTEM

(75) Inventors: Toru Ichien, Higashiyamato (JP); Wataru Yamaguchi, Kodaira (JP); Masae Sasakawa, Kodaira (JP); Mamoru Wakabayashi, Kokubunji (JP)

(73) Assignees: Renesas Technology Corp., Tokyo (JP); Renesas Northern Japan Semiconductor, Inc., Hokkaido (JP); Hitachi Device Engineering Co., Ltd., Chiba (JP)

( * ) Notice: Subject to any disclaimer, the term of this patent is extended or adjusted under 35 U.S.C. 154(b) by 0 days.

(21) Appl. No.: 11/709,777

(22) Filed: Feb. 23, 2007

(65) Prior Publication Data

US 2007/0150768 A1 Jun. 28, 2007

Related U.S. Application Data

(62) Division of application No. 10/702,448, filed on Nov. 7, 2003, now Pat. No. 7,257,720.

(30) Foreign Application Priority Data

Nov. 22, 2002 (JP) ............................ 2002-339128

(51) Int. Cl.
*G06F 13/42* (2006.01)

(52) U.S. Cl. ............................ 713/400; 710/65; 710/66

(58) Field of Classification Search ................. 713/400; 710/65, 66, 306, 307
See application file for complete search history.

(56) References Cited

U.S. PATENT DOCUMENTS

| | | | | |
|---|---|---|---|---|
| 5,388,227 | A * | 2/1995 | McFarland | 710/307 |
| 5,608,882 | A * | 3/1997 | Abert et al. | 710/307 |
| 5,617,546 | A * | 4/1997 | Shih et al. | 710/307 |
| 5,974,493 | A * | 10/1999 | Okumura et al. | 710/307 |
| 6,085,325 | A | 7/2000 | Jackson et al. | 713/300 |
| 6,442,407 | B1 | 8/2002 | Bauer et al. | 455/574 |
| 6,467,042 | B1 | 10/2002 | Wright et al. | 713/320 |
| 6,611,918 | B1 | 8/2003 | Uzelac | 713/320 |
| 6,744,634 | B2 | 6/2004 | Yen | 361/752 |
| 6,816,976 | B2 | 11/2004 | Wright et al. | 713/323 |
| 2003/0178486 | A1 | 9/2003 | Teng et al. | 235/441 |

FOREIGN PATENT DOCUMENTS

| | | |
|---|---|---|
| GB | 2 300 985 | 11/1996 |
| JP | 9-83335 | 3/1997 |
| JP | 11-145897 | 5/1999 |

* cited by examiner

*Primary Examiner*—Rehana Perveen
*Assistant Examiner*—Paul B Yanchus, III
(74) *Attorney, Agent, or Firm*—Miles & Stockbridge P.C.

(57) ABSTRACT

Disclosed herewith is a semiconductor data processing device that realizes low power consumption at the standby time and at the operation time, as well as speeds up the interfacing operation. The semiconductor data processing device can connect a non-volatile storage device to a general-purpose bus of a host system. The data processing device enters the active or standby state in response to the state of the general-purpose bus. In the standby state, the data processing device stops the internal clock signal and applies a substrate bias voltage to each object so as to suppress the potential sub-threshold leak current therefrom. This bias voltage is also applied to the central processing unit and the rewritable non-volatile memory for storing a control program to be executed by the central processing unit. The central processing unit processes data in units of n bits or below when the interface controller and the data transfer controller input/output parallel data in units of 2n bits.

13 Claims, 9 Drawing Sheets

CPU ~2
DMAC ~3
31D
16 BITS
32 BITS
(IDB [31:16]) INTERNAL DATA BUS
(IDB [15:0])
BD3a
BD3b
BD4
SL1
LAT1
LAT2
~7 BUS CONTROLLER
LAT3
LAT4
BD1
BD2
32D
(PDB [31:16]) PERIPHERAL DATA BUS
(PDB [15:0])
32 BITS
32 BITS
USB INTERFACE CONTROLLER ~16
MEMORY CARD INTERFACE CONTROLLER ~15

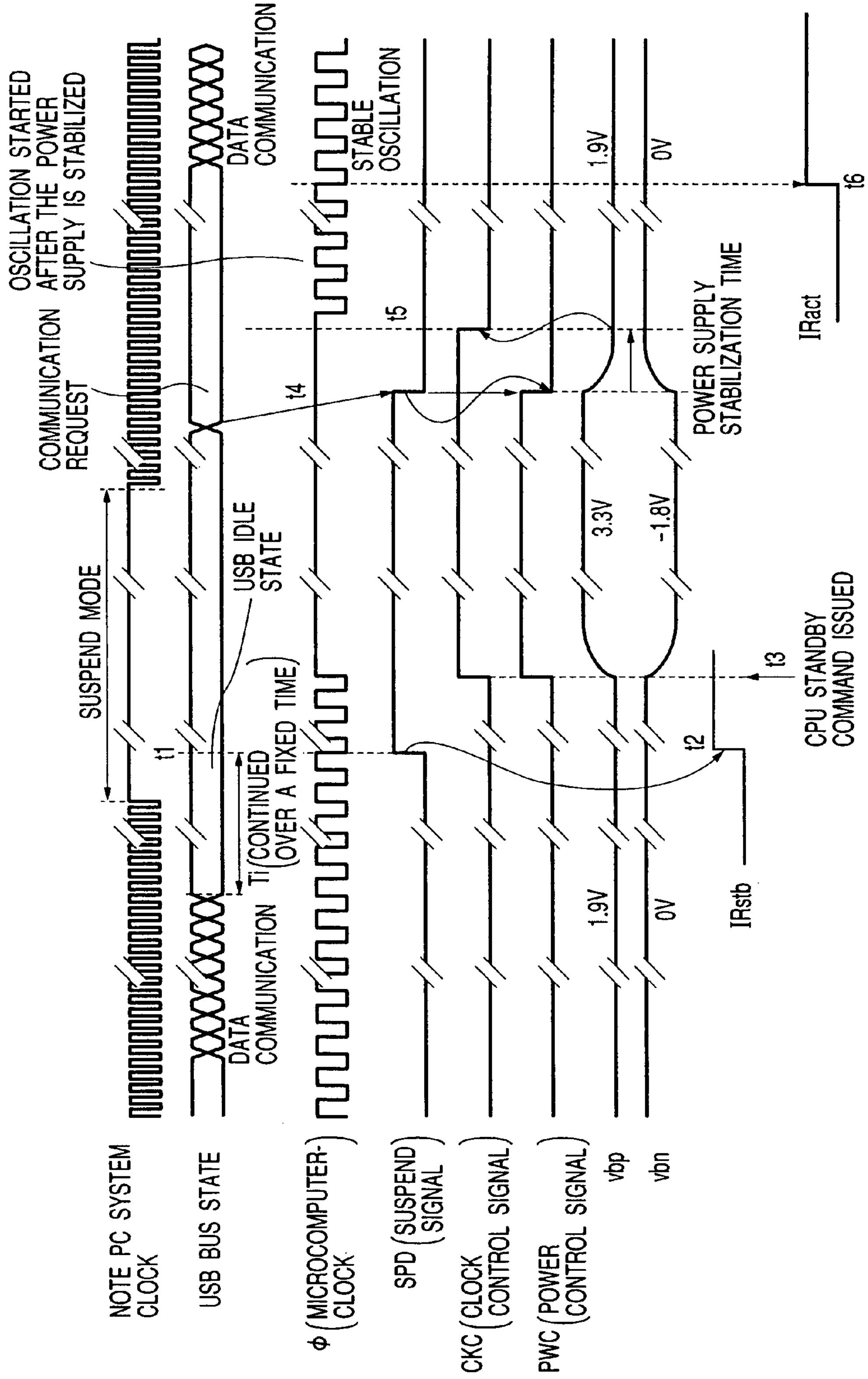
FIG. 5
NOTE PC SYSTEM CLOCK
USB BUS STATE
φ (MICROCOMPUTER-CLOCK)
SPD (SUSPEND SIGNAL)
CKC (CLOCK CONTROL SIGNAL)
PWC (POWER CONTROL SIGNAL)
vbp
vbn
DATA COMMUNICATION
Ti (CONTINUED OVER A FIXED TIME)
USB IDLE STATE
SUSPEND MODE
COMMUNICATION REQUEST
OSCILLATION STARTED AFTER THE POWER SUPPLY IS STABILIZED
DATA COMMUNICATION
STABLE OSCILLATION
POWER SUPPLY STABILIZATION TIME
CPU STANDBY COMMAND ISSUED
1.9V
0V
3.3V
-1.8V
1.9V
0V
IRstb
IRact
t1
t2
t3
t4
t5
t6

| | 31 | | 23 | | 15 | | 7 | | 0 |
|---|---|---|---|---|---|---|---|---|---|
| LONG-WORD DATA : | | D3 | | D2 | | D1 | | D0 | |
| LOWER 2 BITS OF ADDRESS : | | 00 | | 01 | | 10 | | 11 | |

FIG. 8

| | ADDRESS 1, 0 | DATA 31 | 23 | 15 | 7..0 | CPU | DMAC |
|---|---|---|---|---|---|---|---|
| LONG-WORD | xx | D3 | D2 | D1 | D0 | × | ○ |
| WORD | 0x | – | – | D3 | D2 | ○ | ○ |
| | 1x | – | – | D1 | D0 | ○ | ○ |
| BYTE | 00 | – | – | D3 | – | ○ | ○ |
| | 01 | – | – | – | D2 | ○ | ○ |
| | 10 | – | – | D1 | – | ○ | ○ |
| | 11 | – | – | – | D0 | ○ | ○ |

FIG. 9

| | ADDRESS 1, 0 | DATA 31 | 23 | 15 | 7..0 |
|---|---|---|---|---|---|
| LONG-WORD | xx | D3 | D2 | D1 | D0 |
| WORD | 0x | D3 | D2 | – | – |
| | 1x | – | – | D1 | D0 |
| BYTE | 00 | D3 | – | – | – |
| | 01 | – | D2 | – | – |
| | 10 | – | – | D1 | – |
| | 11 | – | – | – | D0 |

(DMAC LONG-WORD WRITING)

(DMAC LONG-WORD READING)

(CPU LONG-WORD WRITING)

(CPU LONG-WORD READING)

SEMICONDUCTOR DATA PROCESSING DEVICE AND DATA PROCESSING SYSTEM

CROSS-REFERENCE TO RELATED APPLICATION

This application is a division of application Ser. No. 10/702,448 filed Nov. 7, 2003 now U.S. Pat. No. 7,257,720.

BACKGROUND OF THE INVENTION

The present invention relates to such a semiconductor data processing device as a data processor, etc., for example, a bridge semiconductor data processing device for connecting a non-volatile storage device to a general-purpose bus of a host system, more particularly to a technique to be applied effectively to a bridge circuit for connecting a memory card to a general-purpose bus of a personal computer (PC).

There have been various methods disclosed so far to reduce power consumption of semiconductor integrated circuits. One of such methods is to control the on/off state of a synchronization clock according to the operation state of the subject integrated circuit (patent document 1) and another is to reduce wasteful power consumption to be caused by a sub-threshold leak by adjusting the substrate bias voltage according to whether or not the integrated circuit stands by (patent document 2).

[Patent Document 1]

Japanese Unexamined Patent Publication No. Hei 11 (1999)-145897

[Patent Document 2]

Japanese Unexamined Patent Publication No. Hei 9 (1997)-83335

SUMMARY OF THE INVENTION

The inventors of the present invention have examined bridge circuits used respectively to connect a memory card to a general-purpose bus of a portable terminal or lap-top personal computer. Each of such bridge circuits needs a function for interfacing between the general-purpose bus and the memory card and a function for transferring data between the general-purpose bus and the memory card. The inventors of the present invention have intended to realize those functions, as well as methods for controlling those functions with use of a semiconductor data processing device.

In that connection, the data transfer rate of such general-purpose buses as the USB (Universal serial bus), etc. as well as the speed of accessing a flash memory card, etc. are expected to become several hundreds of megabits per second, so that the semiconductor data processing device must cope with such fast operations. On the other hand, memory cards are not usually accessed so often and they are not always required to be fast in ordinary operations. And, while the data processor is required to be fast in data transferring and interfacing operations, it is not required to be so fast in such control operations as setting of operational conditions for those interfacing and transferring operations. The inventors of the present invention have paid their attentions to those points and found it necessary to enable the data processor employed for a bridge circuit to reduce stand-by time power consumption, operation time power consumption, and further the power consumption at both standby time and operation time to meet the above fast operation requirement.

Under such circumstances, it is an object of the present invention to provide a semiconductor data processing device employed for a bridge circuit, which can reduce the stand-by time power consumption.

It is another object of the present invention to provide a semiconductor data processing device employed for a bridge circuit, etc., which can reduce the operation time power consumption while assuring fast interfacing operations.

It is still another object of the present invention to provide a semiconductor data processing device employed for a bridge circuit, etc., which can reduce the power consumption at both standby time and interfacing time.

The above and further objects and novel features of the present invention will more fully appear from the following detailed description when the same is read in connection with the accompanying drawings.

The typical aspects of the present invention disclosed in this specification will be summarized as follows.

(1) The semiconductor data processing device capable of connecting a non-volatile storage device to a general-purpose bus of a host system has a clock circuit that goes into the active or standby state in accordance with the state of the general-purpose bus and stops the internal clock in the standby state and a voltage generation circuit that applies a substrate bias voltage in a direction for reducing the sub-threshold leak current in the standby state. This semiconductor data processing device that controls both active and standby states in accordance with the state of the general-purpose bus is thus most suitably employed for a bridge circuit that connects a non-volatile storage device to the general-purpose bus of the host system. In that connection, the data processor stops the internal clock and applies a substrate bias voltage in a direction for reducing the sub-threshold leak current in the standby state as described above, so that the data processing device can reduce the power consumption in the standby state.

More concretely, the semiconductor data processing device includes: a non-volatile memory that stores a control program for enabling the non-volatile storage device to be connected to the general-purpose bus and capable of rewriting data stored therein; and a central processing unit (CPU) that executes the control program. The above-described substrate bias voltage is applied to both of the CPU and the non-volatile memory. Because the CPU operation stops in the standby state, it is considered to be proper to control the substrate bias in the non-volatile memory that stores the control program, as well. This is because it is significant to reduce power consumption in such a non-volatile memory as a flash memory that includes peripheral circuits comparatively large in logical scale so as to control rewriting of information stored therein by reducing the sub-threshold leak current in those peripheral circuits.

The semiconductor data processing device of the present invention has a circuit for detecting the state of the general-purpose bus to control its state changes from standby to active. The substrate bias voltage is not applied to any of this circuit and the above-described voltage generation circuit. Consequently, the state changes from standby to active are controlled independently in each of them.

In another aspect of the present invention, the semiconductor data processing device has a first interface controller for interfacing with the non-volatile storage device. The semiconductor data processing device also has a second interface controller for interfacing with the general-purpose bus and the second interface controller has a circuit for detecting the state of the general-purpose bus. For example, the first interface controller is a memory card interface controller and the second interface controller is a USB interface controller.

In still another aspect of the present invention, the semiconductor data processing device has a data transfer controller for controlling data transfer between the first and second interface controllers. The CPU controls the operations such as setting of transfer control conditions for the data transfer controller with use of the control program. The data transfer controller controls data transfer according to the transfer control conditions in response to each transfer request received from the interface controller.

According to sill another aspect of the present invention, the semiconductor data processing device is configured so as to speed up the interfacing operation and realize low power consumption at the operation time. If the first and second interface controllers, as well as the data transfer controller input/output parallel data in units 2 n bits, the CPU to be employed must input/output parallel data in units of n bits or below. This is because data transferring and interfacing must be fast while controlling of other operations such as setting of operation conditions for both interfacing and transferring is not required to be so fast. The semiconductor data processing device of the present invention is realized on assumption of such a point of view. When compared with another CPU that inputs/outputs parallel data in units of 2 n bits, the number of bits to be processed in the execution block and the buffer block of the semiconductor data processing device of the present invention becomes a half or below, thereby the standby time or polling time power consumption is reduced. In addition, the storage device and the bridge circuit enter the standby state, the standby time or polling time power consumption is reduced more significantly in the processing device as a whole.

The data transfer controller is connected to the 2 n-bit first data bus and the CPU is connected to either of the lower or upper part of the first data bus. In that connection, both of the first and second interface controllers are connected to the 2 n-bit second data bus and provided with a bus controller for connecting the first data bus to the second data bus respectively. The bus controller fixes the correspondence between each signal line of the second data bus and each bit position of access data and varies the correspondence between each signal line of the first data bus and each bit position of access data according to the access data size. Because the correspondence between each signal line of the first data bus and each bit position of access data is varied according to the access data size as described above, the CPU connected to either of the lower or upper part of the first data bus is enabled to divide 2 n-bit data into a plurality of parts and access the divided data separately. In short, the CPU divides the 2 n-bit control data so as to set divided data separately in the first and second interface controllers in a plurality of operations. And, because the correspondence between each signal line of the second data bus and each bit position of access data is fixed as described above, none of the first and second interface controllers is required to have any data aligning device.

(2) According to still another aspect of the present invention, the semiconductor data processing device has a central processing unit (CPU) and a non-volatile memory that stores a control program and capable of rewriting data stored therein. The semiconductor data processing device stops the internal clock and receives a substrate bias voltage in a direction for increasing the threshold voltage in the standby state. The substrate bias voltage is applied to the CPU and the non-volatile memory in the device. Because the CPU stops its operation in the standby state, it is naturally considered to be significant to apply the substrate bias voltage also to the non-volatile memory that stores the control program so as to reduce the power consumption of the non-volatile memory.

If the semiconductor data processing device is to be employed for a bridge circuit that can connect a non-volatile storage device to the general-purpose bus of the host system, the first and second interface controllers controlled by the CPU, as well as the data transfer controller that can control data transfer between the first and second interface controllers should be mounted on the same chip. For example, the first interface controller is actually a memory card interface controller and the second interface controller is actually a USB interface controller.

According to still another aspect of the present invention, in addition to the standby time low power consumption, the semiconductor data processing device is also configured to realize to both fast interfacing and operation time low power consumption. If the first and second interface controllers, as well as the data transfer controller input/output parallel data in units of 2 n bits, the CPU to be employed must process parallel data in units of n bits or below. Because such 2 n-bit parallel input/output is employed for both transferring and interfacing operations, the data processing device is assured for fast operations. As described above, the input/output operation of n bits or below in the data processing device is considered to be enough for such controlling operations as setting of conditions for interfacing and transferring. The CPU power consumption in the standby or polling state is thus reduced far more than that of any CPU that processes parallel data in units of 2 n bits.

The data transfer controller is connected to the first 2 n-bit data bus and the CPU is connected to either of the lower or upper part of the first data bus. In that connection, the first and second interface controllers are connected to the second 2 n-bit data bus and provided with a bus controller used for the connection between the first data bus and the second data bus respectively. The bus controller fixes the correspondence between each signal line of the second data bus and each bit position of access data and varies the correspondence between each signal line of the first data bus and each bit position of access data according to the access data size. Because the correspondence between each signal line of the first data bus and each bit position of access data is varied according to the access data size such way, the CPU connected to either of the lower or upper part of the first data bus is enabled to divide 2 n-bit data into a plurality of parts and access the divided data separately. And, because the correspondence between each signal line of the second data bus and each bit position of access data is fixed, the first and second interface controllers are not required to have any data aligning device.

(3) According to still another aspect of the present invention, the semiconductor data processing device includes: a first peripheral circuit that inputs/outputs 2 n-bit parallel data; a second peripheral circuit that inputs/outputs 2 n-bit parallel data; a data transfer controller that can input/output 2 n-bit parallel data and control data transfer between the first and second peripheral circuits; a first 2 n-bit data bus to which the data transfer controller is connected; and a central processing unit (CPU) that processes parallel data in units of n bits or below and connected to either of the lower or upper part of the first data bus.

The first and second peripheral circuits are connected to the second 2 n-bit data bus and provided with a bus controller used for the connection between the first data bus and the second data bus respectively.

The bus controller fixes the correspondence between each signal line of the second data bus and each bit position of access data and varies the correspondence between each signal line of the first data bus and each bit position of access data according to the access data size.

(4) The data processing system of the present invention has a bridge circuit for connecting a non-volatile storage device to a general-purpose bus. The bridge circuit has a semiconductor data processing device for controlling data transfer between the general-purpose bus and the non-volatile storage device. The semiconductor data processing device includes a data transfer controller, a central processing unit (CPU), and a non-volatile memory that stores the control program and can rewrite data stored therein. The data processing device changes its state from active to standby in accordance with the first state of the general-purpose bus and stops the internal clock signal and applies a substrate bias voltage in a direction for reducing the sub-threshold leak current in the standby state, then changes its state from standby to active in accordance with the second state that follows the first state.

In the standby state, the substrate bias voltage is applied to the central processing unit and the non-volatile memory.

The non-volatile storage device is a non-volatile memory card, the general-purpose bus is a USB bus, the first state is an idle state, and the second state is a communication requesting state.

(5) According to still another aspect of the present invention, the semiconductor data processing device comprises a central processing unit, a non-volatile memory capable of writing/erasing data therein/therefrom electrically and storing a control program to be executed in the central processing unit, a clock generation circuit, and a first control circuit. When the semiconductor data processing device enters the standby state, the first control circuit controls the central processing unit, the non-volatile memory, and the clock generation circuit so that the clock generation circuit stops the clock generation, thereby a sub-threshold leak current is reduced in each MOS transistor used in each of those components.

The first control circuit receives first and second supply potentials to be driven to operate regardless of the standby state.

More concretely, the semiconductor data processing device further includes a peripheral circuit (16) and the peripheral circuit (16) includes a first detection circuit (16A) for detecting the state of a bus to which it is to be connected. The first control circuit controls the elements of the peripheral circuit except for the first detection circuit in response to the standby state. The first detection circuit receives first and second supply potentials (vdd and vss) to be driven to operate regardless of the standby state.

Furthermore, the semiconductor data processing device further includes a second control circuit (13) and the second control circuit (13) includes a second detection circuit (13A) for detecting the output of the first detection circuit. The first control circuit controls the elements of the second control circuit other than the second detection circuit in response to the standby state. The second detection circuit receives the first and second supply potentials (vdd and vss) to be driven to operate.

(6) Furthermore, according to still another aspect of the present invention, the data processing system includes a bridge circuit for connecting a non-volatile storage device to a general-purpose bus. The bridge circuit includes a semiconductor data processing device for controlling the data transfer between the general-purpose bus and the non-volatile storage device. The semiconductor data processing device includes a data transfer controller, a central processing unit, a rewritable non-volatile memory for storing a control program to be executed by the central processing unit, a clock generation circuit, and a first control circuit. The semiconductor data processing device changes its state from standby to active in response to the first state of the general-purpose bus. In the standby state, the clock generation circuit stops the clock generation and the control circuit controls the central processing unit, the non-volatile memory, and the clock generation circuit so as to reduce the sub-threshold leak current in each MOS transistor used in the central processing unit, the non-volatile memory, and the clock generation circuit. The semiconductor data processing device changes its state from standby to active in response to the second state of the general-purpose bus, which comes after the first state.

The first control circuit of the semiconductor data processing device receives the first and second supply potentials (vdd and vss) to be driven to operate regardless of the standby state.

The semiconductor data processing device further includes a peripheral circuit (16) and the peripheral circuit (16) includes a first detection circuit (16A) for detecting the state of the bus. The first control circuit controls the elements of the peripheral circuit (16) except for the first detection circuit in response to the standby state. The first detection circuit receives first and second supply potentials to be driven to operate regardless of the standby state.

Furthermore, the semiconductor data processing device further includes a second control circuit (13) and the second control circuit (13) includes a second detection circuit (13A) for detecting the state of the first detection circuit. The first control circuit controls the elements of the second control circuit other than the second detection circuit in response to the standby state. The second detection circuit receives the first and second supply potentials (vdd and vss) to be driven to operate regardless of the standby state.

BRIEF DESCRIPTION OF THE DRAWINGS

FIG. 5 is a timing chart of the lap-top PC that is set in the suspend state, then restored from the suspend state to start an operation;

FIG. 8 is a chart for describing the data alignment in an internal data bus corresponding to a data size;

FIG. 9 is a chart for describing data alignment that fixes the correspondence between each signal line of a peripheral data bus and each bit position of access data regardless of the access data size;

DETAILED DESCRIPTION OF THE PREFERRED EMBODIMENTS

<<Data Processor of Bridge Circuit>>

Figure 1:
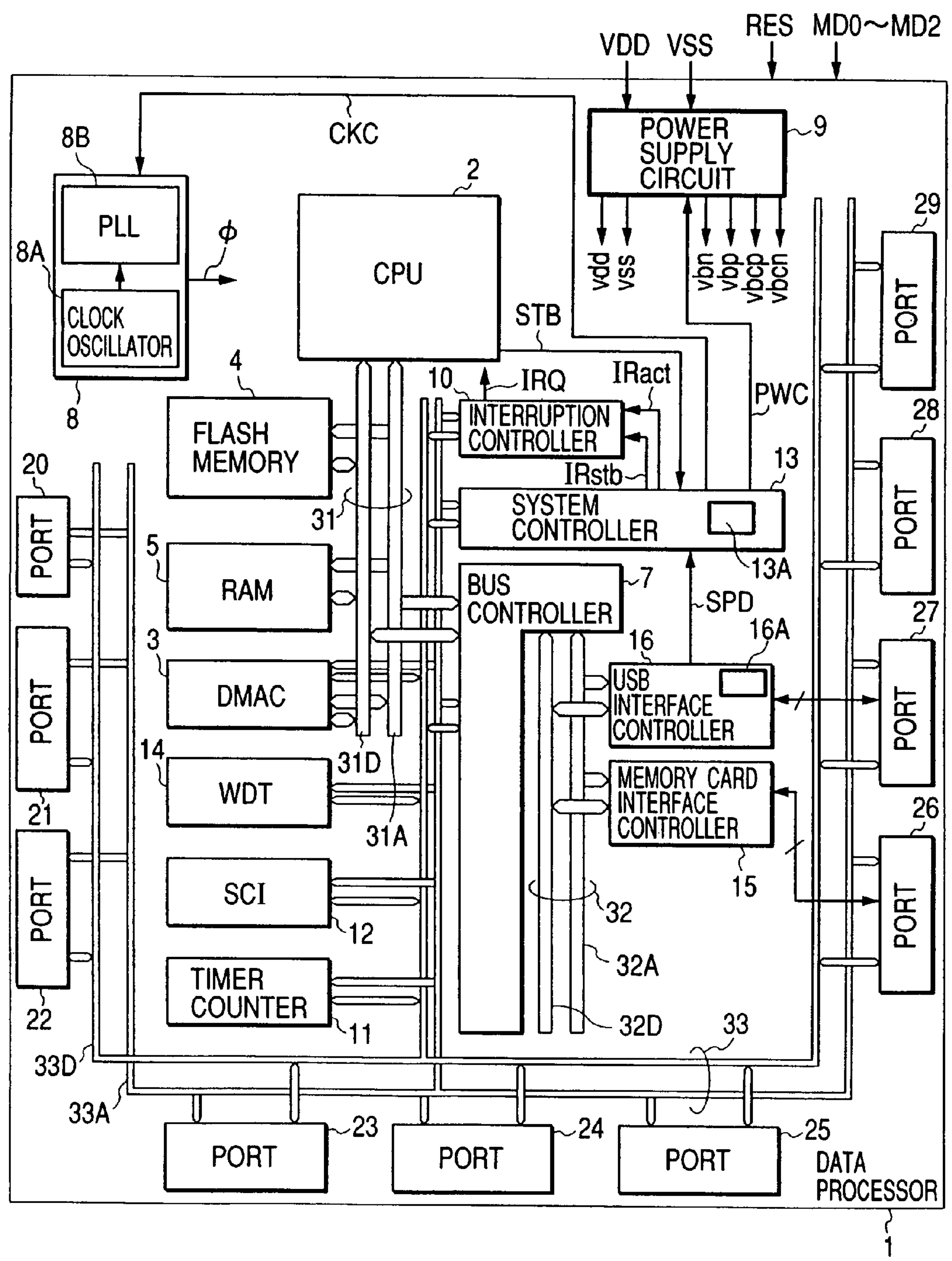
FIG. 1 is a block diagram of a data processor in an embodiment of the present invention.

FIG. 1 shows a data processor in an embodiment of the present invention. The data processor 1 shown in FIG. 1 is formed on a semiconductor substrate (semiconductor chip) formed with, for example, single crystallization silicon by a complementary MOS (CMOS) integrated circuit manufacturing technique.

The data processor 1 comprises a central processing unit (CPU) 2, a DMA controller (DMAC) 3 provided as a data transfer controller, a flash memory 4 provided as a non-volatile memory capable of electrically storing, writing, and erasing such information and data as a control program to be executed in the CPU 2, a random access memory (RAM) 5 provided as a non-volatile memory used as a working area of the CPU 2 and for storing data temporarily, a bus controller 7, a clock generation circuit 8, a power supply circuit 9, an interruption controller 10, a timer counter 11, a serial communication interface controller (SVI) 12, a system controller 13, a watch-dog timer (WDT) 14, a memory card interface controller 15 provided as a first peripheral circuit or first interface controller, a USB interface controller 16 provided as a second peripheral circuit or second interface controller, and input/output ports (PORT) 20 to 29.

The CPU 2, the DMAC 3, the flash memory 4, the RAM 5, and the bus controller are connected to an internal bus 31 respectively. The internal bus 31 is composed of a 32-bit data bus 31D, an address bus 31A, and a control bus (control signal bus) that is not shown in FIG. 1. The internal bus 31 interfaces to a peripheral bus 32 and another peripheral bus 33 through the bus controller 7. The peripheral bus 32 is composed of a 32-bit data bus 32D, an address bus 32A, and a control bus (control signal bus) that is not shown in FIG. 1. The peripheral bus 33 is composed of a 32-bit data bus 33D, an address bus 33A, and a control bus (control signal bus) that is not shown in FIG. 1. The USB interface controller 16 and the memory card interface controller 15 are connected to the peripheral bus 32 respectively. The interruption controller 10, the TMR 11, the SCI 12, the system controller 13, the WDT 14, and the input/output ports 20 to 29 are connected to the peripheral bus 33 respectively.

The internal bus 31 can interface with the peripheral buses 32 and 33 through the bus controller 7.

A predetermined I/O port of the I/O ports 20 to 29, for example, the I/O port 27, is allocated to an external connection port of the USB interface controller 16. The I/O port 26 is allocated to an external connection port of the memory card interface controller. Although the detailed description is to be made later, the data processor 1 is employed for a bridge circuit that connects a non-volatile storage device such as a memory card to a general-purpose bus such as a USB bus of a host apparatus such as a personal computer (PC). The I/O port 27 is connected to an external USB bus while the I/O port 26 is connected to an external memory card connector. The DMAC 3 controls the data transfer between the USB interface controller 16 and the memory card interface controller 15. The CPU 2 controls such operations as setting of conditions for the USB interface controller 16, the memory card interface controller 15, and the DMAC 3 by executing the control program stored in the flash memory 4.

The CPU 2 and the DMAC 3 are bus master modules provided in the data processor 1. The CPU 2 includes an instruction control unit for fetching instructions from, for example, the flash memory 4 and decoding them and an execution unit for executing arithmetic operations using a general register and an arithmetic and logical unit according to the result of each decoded instruction received from the instruction controller. The DMAC 3 that stores data transfer conditions to be initialized by the DMAC 3 controls data transfer in response to data transfer requests received from the peripheral circuits 15 and 16, etc.

The bus controller 7 arbitrates the conflict between bus privilege requests issued from the CPU 2 and the DMAC 7 that are bus master modules. Arbitration of those bus privilege requests is controlled, for example, in the order of priority. A bus master module, when being privileged to use the subject bus, outputs a bus command while the bus controller 7 controls the bus according to the bus command.

The interruption controller 10 inputs interruption request signals IRstb and IRact typically output from such a circuit module as the system controller 13 connected to the peripheral bus 22 to control both priority and masking in response to each inputted interruption signal and accepts the interruption request. The interruption controller 10, when accepting such an interruption request, outputs the interruption signal IRQ to the CPU 2. The CPU 2 then suspends the current processing and goes to the predetermined processing routine according to the interruption factor. At the end of the processing routine, the CPU 2 executes a return instruction to restart the suspended processing. The interruption request signal IRstb is an interruption request signal to set the object in the standby state. The interruption request signal IRact is an interruption request signal for requesting the object to return to the active state from the standby state.

Although not limited specially, the clock generation circuit 8 generates a system clock signal ϕ by multiplying the oscillation output of a clock oscillator 8A in a PLL (phase locked loop) circuit 8B. A clock control signal CKC is used to control starting and stopping of the oscillation of the clock generation circuit 8.

The power supply circuit 9 provided as a first control circuit steps down the 3.3V supply voltage (VCC=3.3V, VSS=0V) supplied from an external terminal to supply a 1.9V internal supply voltage (vdd=1.9V, vss=0V) to each object in the chip. Furthermore, the power supply circuit 9 generates substrate bias voltages (vbn and vbp) and control voltages (vbcn and vbcp). The vbn and vbp are used as power supply bias voltages to be applied to the objects while the vbsn and vbcp are used as control signals. All of the vbn, vbp, vbcn, and vbcp are supplied in the chip. The substrate bias voltages vbn and vbp are 1.9V and 0V in the active state, which is a normal state while they become 3.3V and −1.8V in the standby state, which is a low power consumption state. At the same time, vdd=1.5V is assumed to reduce the sub-threshold leak current from each internal circuit. The system controller 13 issues a power supply control signal PWC to control both substrate bias and power supply according to the active/standby state.

Figure 2:
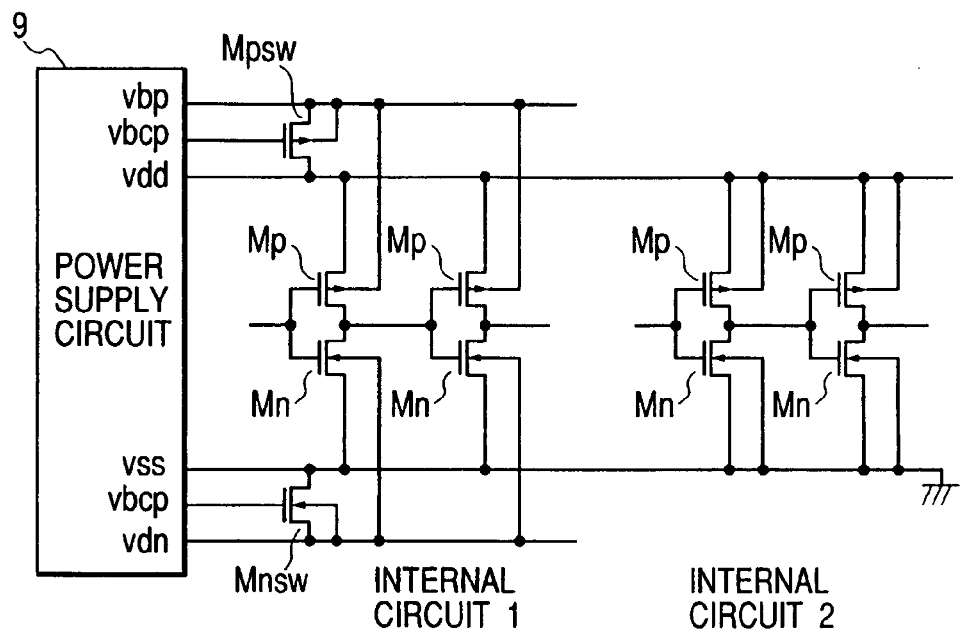
FIG. 2 is a circuit diagram of supply paths of an operation power and a substrate bias voltage from a power supply circuit to elements in a chip.

Both operation power supply and substrate bias voltage are supplied from the power supply circuit 9 to each internal circuit in the chip through the paths as shown in FIG. 2. In FIG. 2, an internal circuit 1 in the chip is typically composed of two CMOS inverters connected to each other serially while another internal circuit 2 is typically composed of two CMOS inverters connected to each other serially. Each of those CMOS inverters is composed of a p-channel MOS transistor Mp and an n-channel MOS transistor Mn. In the normal state, vdd=vbp=1.9V and vss=vbn=0V are assumed. The substrate-source potential is set at 0V for both MOS transistors Mn and Mp. Both vbcp and vbcn may be set at any value respectively. In the standby state, vdd=1.5V, vbp=3.3V, vss=0V, and vbn=−1.8V are assumed. The substrate-source potential is set at 1.8V for both MOS transistors Mp and Mn in the opposite direction. The voltage is equal between vbcp and vbp while the potential is equal between vbcn and vbn. And, switch MOS transistors Mpsw and Mnsw are cut off. The threshold voltage of both MOS transistors Mn and Mp in the chip increases due to this substrate biased state, thereby the sub-threshold leak current from each MOS transistor in the internal circuit 1 is suppressed. On the other hand, the substrate gates of the MOS transistors Mp and Mn provided in the internal circuit 2 are connected to the internal power supplies vdd and vss respectively. The internal circuit 2, as to be described later, is required to operate even in the standby state just like the circuit 13A, the USB bus state detection circuit 16A, etc. in the system controller 13.

The system controller 13 inputs the reset signal RES, the mode signals MD0 to MD2, the standby signal STB, the suspend signal SPD, etc. to control the operation mode of the data processor 1.

The data processor 1, when receiving a reset signal RES, resets such on-chip circuit modules as the CPU 2. The CPU 2, when being reset by this reset signal RES, fetches an instruction from the start address of a predetermined control program to start the program.

Figure 3:
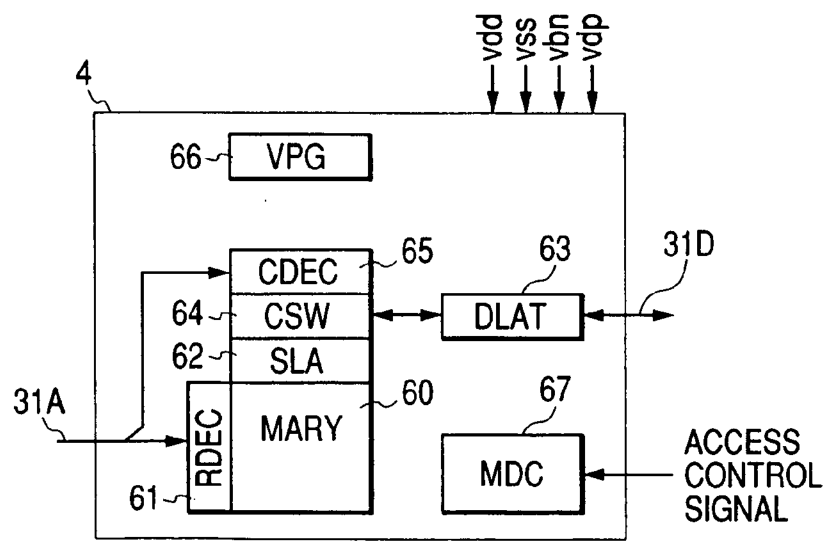
FIG. 3 is a detailed block diagram of a flash memory.

FIG. 3 shows a detailed block diagram of the flash memory. A memory array (MARY) 60 includes many non-volatile memory cells disposed in a matrix. The non-volatile memory cells may be any of the floating gate type and the uneven charge holding type. The floating gate type memory cell stores information according to a threshold voltage difference caused by charging/discharging of electrons to/from the floating gate while the uneven charge holding type memory cell stores information according to a charge-trapped position in a non-conductive charge trapping area. A row decoder (RDEC) 61 decodes a row address signal to select a word line of a non-volatile memory cell. A sense latch array (SLA) 62 includes a sense latch circuit for latching write control information or senses data to be read for each bit line of a non-volatile memory. A data latch circuit (DLAT) 63 inputs written data from the data bus 31D and outputs read data to the date bus 31D. A column switch circuit (CSW) 64 enables the sense latch circuit and the data latch circuit 63 in the sense latch array 62 to be connected to each other. A column decoder (CDEC) 65 decodes a column address signal to control the selection of the sense latch circuit to be connected to the data latch circuit 63 through the column switch circuit 64. A mode control circuit (MDC) 67 inputs an access control signal to control such memory operations as writing, erasing, and reading. A high voltage circuit (VPG) 66 generates a high voltage required to write and erase information with use of a charge pump, etc. The high voltage is supplied to the memory array 60, the row decoder 61, the sense latch array 62, etc.

The flash memory 4 operates with supply voltages vdd and vss and the whole flash memory 4 receives the substrate bias voltages vbn and vbp in the standby state.

Figure 4:
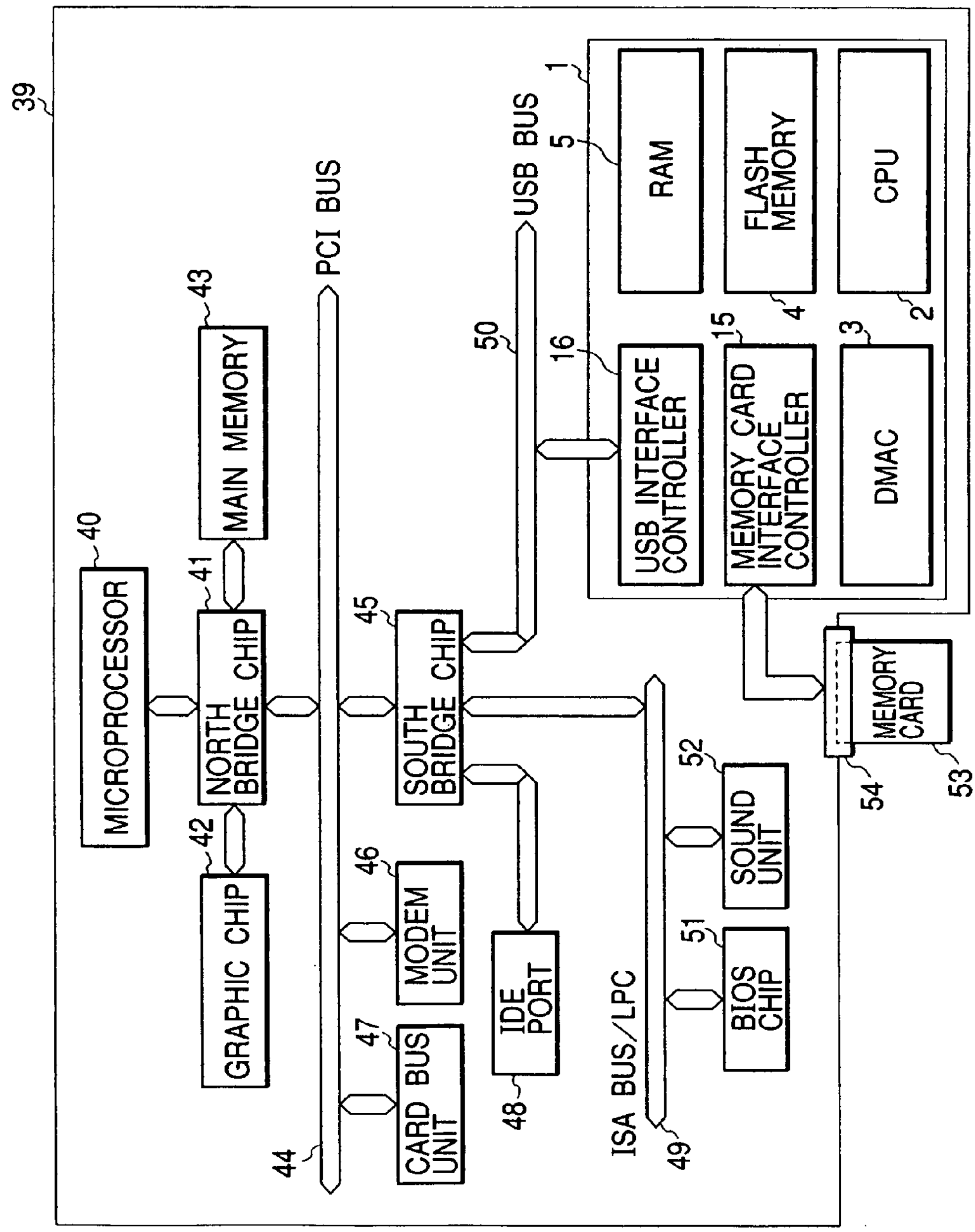
FIG. 4 is a schematic block diagram of a data processing system, for example, a lap-top PC that employs the data processor shown in FIG. 1.

FIG. 4 shows a schematic block diagram of a data processing system, for example, a lap-top PC processor board 39 in which the data processor 1 is employed. The processor board 39 is composed of various semiconductor circuit chips and circuit modules mounted on a printed circuit board. A chip set referred to as a north bridge is connected to this microprocessor 40 mounted on this processor board 39. And, a graphic chip 42, a main memory 43 composed of a SDRAM (Synchronous Dynamic Random Access Memory), etc., and a PCI (Peripheral Component Interconnect) bus 44 are connected to this north bridge chip 41. The graphic chip 42 is connected to a liquid crystal display (not shown). The PCI bus 44 is connected to a chip set 45 referred to as a south bridge, a modem unit 46, a card bus unit 47, etc. The south bridge 45 is connected to an IDE (Integrated Device Electronics) port 48, an ISA (Industry Standard Architecture) bus (or LPC (Low Pin Count)) 49, and a USB bus 50. The IDE port is connected to a CD-ROM (Compact Disk Read Only Memory) drive, an HDD (Hard Disk Drive), etc. The ISA bus (or LPC) 49 is connected to a BIOS chip 51, a sound unit 52, etc. The USB bus 50 is connected to the data processor 1 that functions as a bridge circuit of the memory card 53. The USB interface controller 16 is connected to the USB bus 50, so that the memory card interface controller 15 can be connected to the memory card 53 through a connector 54. Although not limited specially, the USB interface controller 16 and the USB bus 50 conform to the USB version 2.0 respectively.

The lap-top PC has a suspend mode (the standby mode for ordinary lap-top PCs) for reducing power consumption by stopping the system clock signal and turning off the power supply to the LCD and the built-in HDD while retaining the contents in the main memory 43.

If the lap-top PC enters the suspend mode, the supply of the operation clock signal to the south bridge 45 is also stopped, thereby the USB bus 50 stops in a data communication inactive state (USB idle state). The data processor 1 then enters the standby state in response to this idle state.

<<Controlling State Changes between Standby and Active>>

Hereinafter, a description will be made for how the data processor 1 controls its state changes from active to standby or from standby to active in response to the idle state.

FIG. 5 shows a timing chart in which the lap-top PC enters the suspend state, then exists the suspend state to start an operation. The USB interface controller 16 detects the state of the USB bus 50 to enable the USB bus 50 to interface with the object. The USB interface controller 16, when detecting the USB idle state for a certain time (Ti) and over continuously, asserts the suspend signal SPD, which is an internal signal (at time t1). Receiving the suspend signal SPD from the USB interface controller 16, the system controller 13 asserts a suspend interruption request signal IRstb to the interruption controller 10 (at time t2). If the interruption controller 10 accepts such a suspend interruption request decided as a result of the determination of the conflict among request priority levels, the controller 10 asserts the interruption signal IRQ to the CPU 2. The CPU 2, after completing the instruction execution for the current processing, obtains a branch address from the interruption vector specified by the interruption request and executes a CPU 2 standby instruction (at time t3). Consequently, the CPU 2 sets the standby flag (not shown) and asserts the standby signal STB to the system controller 13. The system controller 13 then asserts the clock control signal CKC and instructs the clock generation circuit 8 to stop the clock generation. At the same time, the system controller 13 asserts the power supply signal PWC to request the power supply circuit 9 to apply the substrate bias to the power supply circuit 9. As a result, the power supply circuit 9 controls both vbn and vbp to be set to the values as shown in FIG. 2, then applies the back bias so that the system enters the low power consumption mode in which the sub-threshold leak current in each internal circuit is reduced.

If the lap-top PC returns from the suspend state to start an operation again, the USB bus 50 enters a communication requesting state. In response to the communication requesting state, the data processor 1 must enter the active state in response to the state. The USB interface controller 16 is provided with a circuit 16A for negating the suspend signal SPD in response to a communication request received from the USB bus 50. The circuit (the USB bus state detection circuit or first detection circuit) 16A does not receive any substrate bias voltage even when the data processor 1 is in the standby state, so that the circuit is kept ready for operation. There is also such a circuit 13A (the second detection circuit), which detects the negated suspend signal SPD to control the power supply circuit 9. The power supply circuit 9 does not receive any substrate bias voltage, of course. In the standby state, the circuits 13A, 16A, and 9 that do not receive any substrate bias should preferably be laid out in a group.

If the USB bus state detection circuit 16A detects the communication requesting state of the USB bus 50, the suspend signal SPD is negated (at time t4). The system controller 13 then negates the power supply control signal PWC to instruct the power supply circuit 9 to stop the substrate bias to change the internal voltages vdd, vss, vbp, and vbn to normal operation voltages respectively. The system controller 13, after detecting that those voltages are stabilized in the power supply circuit 9, negates the clock control signal CKC to instruct the clock generation circuit 8 to restart the oscillation of the clock signal φ (at time t5). In a predetermined period (ex., a few tens of micron seconds) for stabilizing the oscillation, the system controller 13 asserts the interruption request signal IRact to the interruption controller 10, thereby the CPU 2 recognizes the state changes from standby to active with the interruption signal IRQ. Consequently, the USB interface controller 16 that has accepted a communication request from the USB bus 50 gets ready to start data communication under the control of the CPU 2, then it is permitted to write information to the memory card 53 from the USB bus 50 or to read the information to the USB bus 50 from the memory card 53 through the DMAC 3.

According to the standby/active state change controlling by the data processor 1, both active and standby states are controlled in response to the state of the USB bus 50. Such controlling will thus be suitable most for the bridge circuit that connects such a non-volatile storage device as the memory card 53 to such a general-purpose bus as the USB bus 50. And, because the internal clock signal stops and a bias voltage is applied to each object in a direction for reducing the sub-threshold leak current in the standby state, the system power consumption in the standby state is reduced.

The substrate bias voltage is applied to both of the CPU 2 and the flash memory 4. Because the CPU 2 stops its operation in the standby state, it would be better to control the substrate bias voltage of the flash memory 4 that stores the control program executed by the CPU 2 together with the CPU 2 to realize low power consumption. The flash memory 4 usually has such peripheral circuits as a mode control circuit 67 and a high voltage generation circuit 67 that are comparatively large in logic scale so as to control rewriting of information stored therein. It would thus be very effective to reduce the sub-threshold leak current from those circuits, thereby reducing the power consumption in the flash memory.

As described above, the circuits 16A and 13A for detecting the state of the USB bus 50 to control the state changes from standby to active respectively, as well as the power supply circuit 9 do not receive any substrate bias voltage in the standby state. In each of those circuits, therefore, it is possible to control the state changes from standby to active independently.

Figure 14:
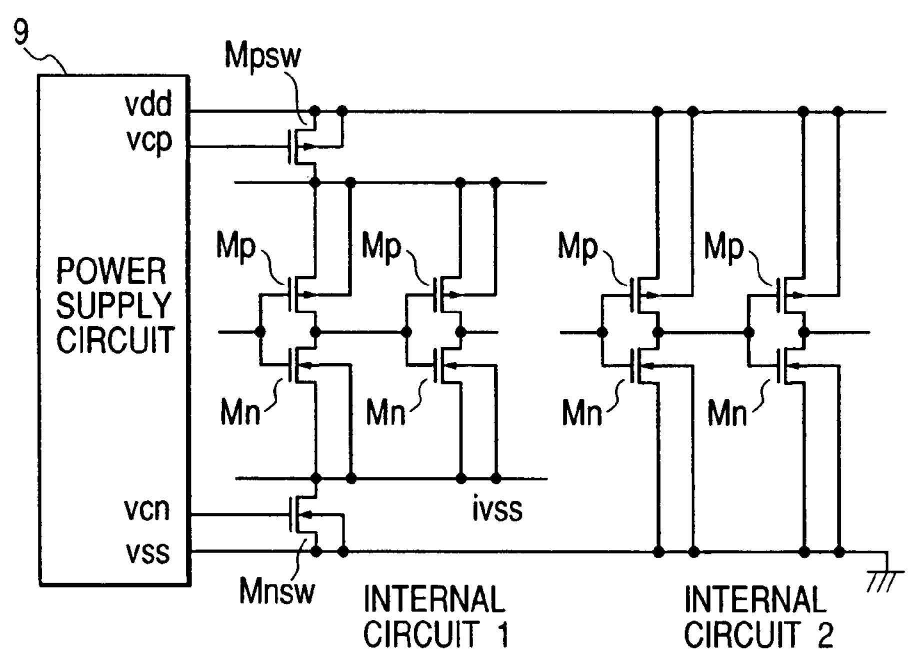
FIG. 14 is a circuit diagram of an internal circuit 1 when a power supply circuit supplies an operation power to the circuits in a chip through power switch transistors Mpsw1 and Mnsw1.

Furthermore, the sub-threshold current is reduced in each MOS transistor with a substrate bias voltage applied thereto in the standby state as described above. However, the effect may be obtained with the method as shown in FIG. 14. In that connection, the internal circuit 1 is configured by a plurality of inverters connected between the internal power supply lines ivdd and ivss, a power switch P-channel MOS transistor Mpsw1 connected between the internal power supply lines ivdd and ivss, and a power switch N-channel MOS transistor Mnsw1 connected between step-down power supply lines vdd and vss. The configuration of the internal circuit 2 is the same as that shown in FIG. 2, so that the description for that will be omitted here. In the standby state, the power switch P-channel MOS transistor Mpsw1 is deactivated with the control signal Vcp generated from the power supply circuit 9. The power switch N-channel MOS transistor Mnsw1 is also deactivated in the standby state with the control Vcn generated from the power supply circuit 9. As a result, the plurality of inverters provided in the internal circuit 1 do not receive any internal step-down power supply in the standby state respectively, so that the sub-threshold current is reduced in each MOS transistor in those inverters of the internal circuit 1. On the other hand, in the active state, the power switch P-channel MOS transistor Mpsw1 and the power switch N-channel MOS transistor Mnsw1 are activated/deactivated with the control signal Vcn generated from the power supply circuit 9, so that the plurality of inverters in the internal circuit 1 receive the internal step-down power supply respectively.

<<Speeding Up Interfacing and Reducing Operation Time Power Consumption>>

Figures 6, 7:
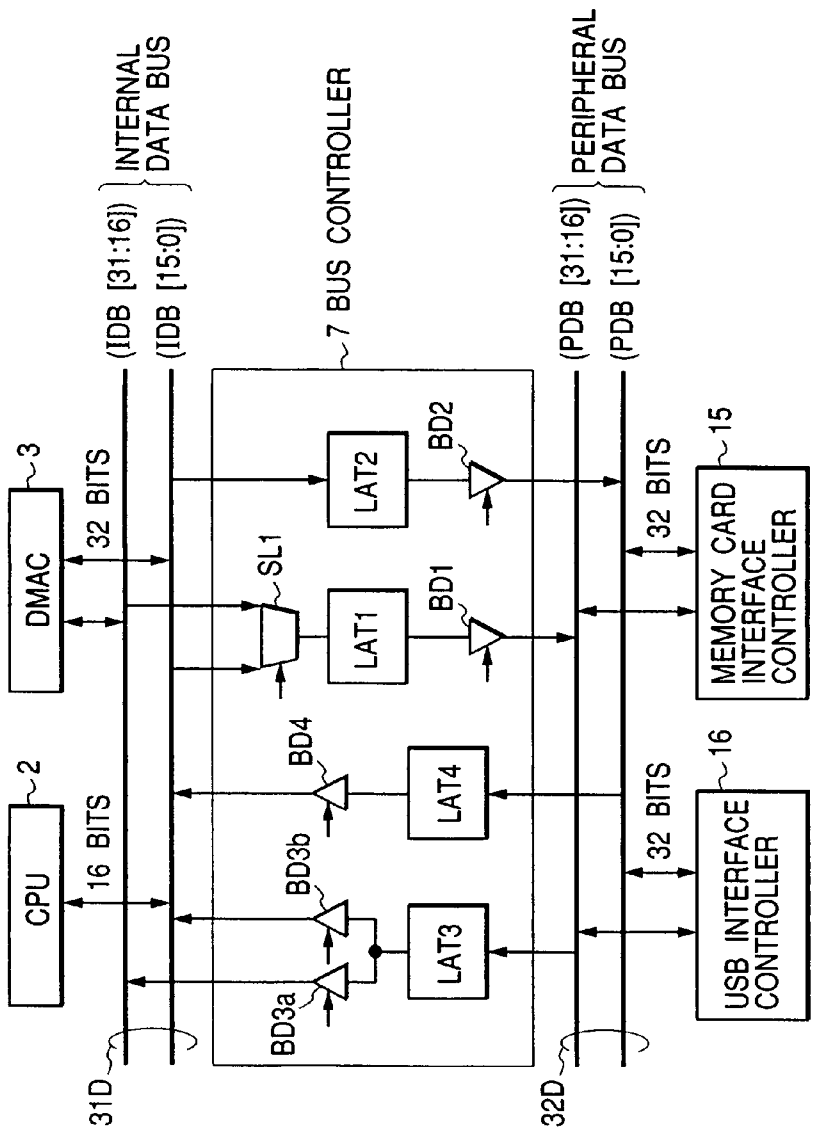
FIG. 6 is a detailed block diagram of a data bus bridge portion in a bus controller.
FIG. 7 is a chart for describing the correspondence between the byte data D0 to D3 of a long word and the lower two bits of an address.

FIG. 6 shows details of a data bus bridge provided in the bus controller 7.

In the USB version 2.0 standard, the data transfer rate is specified as 480 M bits/sec. In the next generation memory card interface, the access rate is specified as 100 to 200 M bits/sec. In the data processor 1 for bridging data between those devices with different data transfer rates, how much the data transfer rate is improved is thus very important.

To improve such data transfer rates, in the data processor 1, the data transfer rate of the peripheral data bus 32D is set at 32 bits and the number of I/O bits of parallel data is set at 32 bits in each of the USB interface controller 16 and the memory card interface controller 15 connected to the peripheral data bus 32D respectively. Furthermore, the number of I/O bits of parallel data is set at 32 bits for the DMAC 3 and the bus width of the internal data bus 31D is set at 32 bits so that the DMA transfer can be made in units of 32 bits between the USB interface controller 16 and the memory card interface controller 15.

Such a data processor 1 employed for a data bridge circuit is not required of so fast operations except for data transfer. Thus, lap-top PCs that require such low power consumption are not required to use a 32-bit CPU that needs much power consumption; a 16-bit CPU will be enough to make the PC to display its processing ability. This is why the data processor 1 employs a 16-bit low power consumption CPU as the CPU 2. A 16-bit CPU means a CPU that has an execution block or computing block that processes data in units of 16 bits. Usually, the CPU 2 inputs/outputs parallel data in units of 16 bits.

The 16-bit data input/output terminal of the CPU 2 is connected to the lower 16-bit IDB [15:0] of the internal data bus. In that connection, the address signals are assumed as byte addresses and the correspondence between byte data D0 to D3 in each long word and the lower two bits of each address is as shown in FIG. 7. The data alignment in the internal data bus 31D corresponding to the data size is as shown in FIG. 8. The upper 16 bits IDB [31:15] of the internal data bus 31D are used only to access long words (32 bits each). To access word data (16 bits) and byte data (8 bits), only the lower 16 bits are used even in the DMAC 3 to which the 32-bit bus 31D is connected. In short, the correspondence between each signal line of the internal data bus 31D and each bit position of access data is varied according to the access data size. Because the correspondence is varied such way, the CPU 2 connected to the lower side of the internal data bus 31D is enabled to access 32-bit data twice in units of 16 bits.

The peripheral bus 32D, as shown in FIG. 9, should be designed so as to output data even to the upper side data bus according to the target address whether the data is accessed in words or in bytes. In short, the correspondence between each signal line of the peripheral data bus 32D and each bit position of access data is fixed regardless of the access data size. Because such fixed alignment is employed, such peripheral modules as the USB interface controller 16 and the memory card interface controller 15 are not required to have a data aligning device used to input/output data, thereby the designing is made easy.

The bus controller 7 is provided with the first to fourth latch circuits LAT1 to LAT4, a selector SL1, and bus drivers BD1, BD2, BD3*a*, BD3*b*, and BD4 shown in FIG. 6 that are used as a data bus bridge for bridging data between the internal data bus 31 and the peripheral data bus 32 having different data alignment types as described above. The bus control logic (not shown) in the bus controller 7 is used to control data latching and data selection in those devices, as well as driving of those devices according to the type of the access-privileged device, the access data size, and the access direction.

Figure 10:
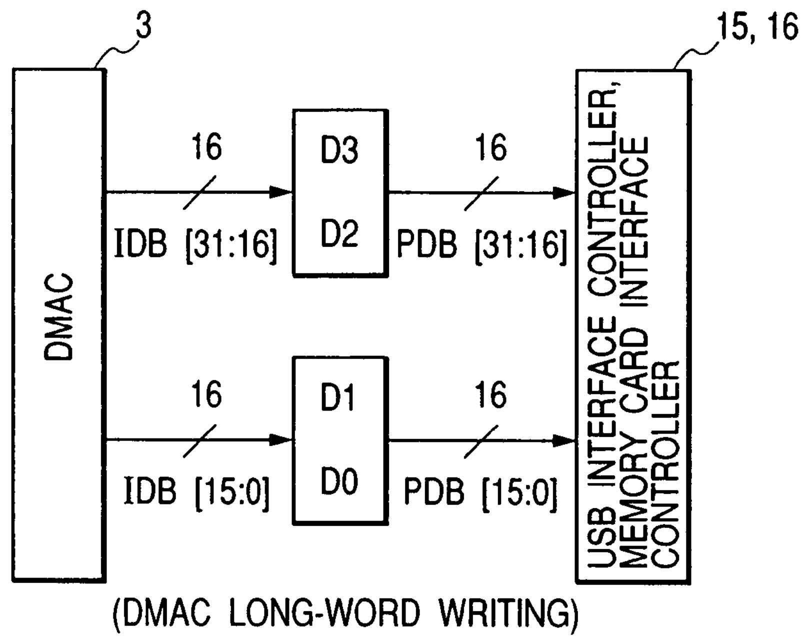
FIG. 10 is a chart for describing how a bus bridge is controlled when in accessing a USB interface controller or memory card interface controller to write long-word data therein with use of a DMAC.
Figure 11:
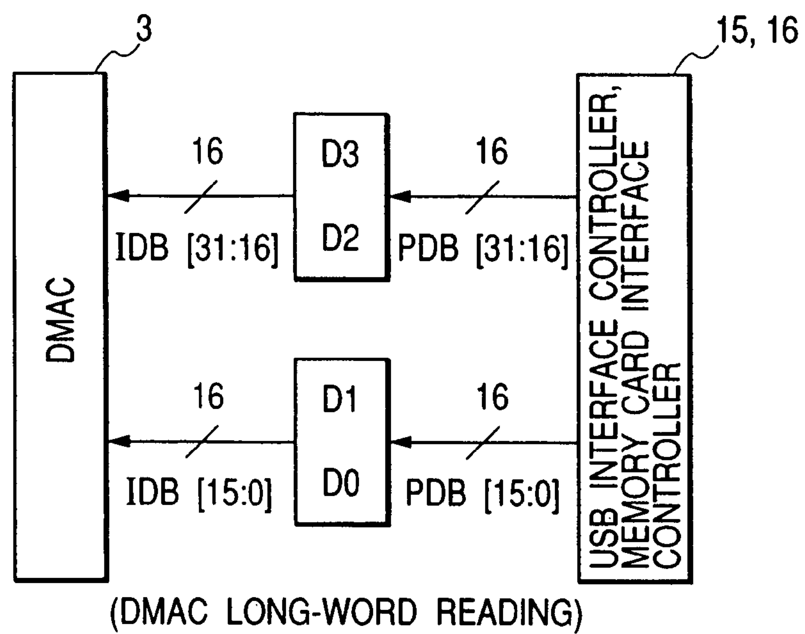
FIG. 11 is a chart for describing how a bus bridge is controlled when in accessing a USB interface controller or memory card interface controller to read long-word data therefrom with use of a DMAC.

FIG. 10 shows how a bus bridge is controlled when accessing the USB interface controller 16 or memory card interface controller 15 to write data thereto in long words with use of the DMAC. FIG. 11 shows how a bus bridge is controlled when accessing the USB interface controller 16 or memory card interface controller 15 to read data therefrom in long words with use of the DMAC. Because the peripheral module (the USB interface controller 16 or memory card interface controller 15) inputs/outputs parallel data in units of 32 bits, it can complete the long-word access only in one bus cycle.

When in the long-word access shown in FIG. 10, the upper part data (D3 and D2) is transferred to the object device in the order of IDB[31:16]→SL1→LAT1→BD1→PDB[31:16] while the lower part data (D1 and D0) is transferred in the order of IDB[15:0]→+AT2→BD2→PDB[15:0], thereby the data is written in the data register of the subject peripheral module.

When in the long-word accessing shown in FIG. 11, the upper part data (D3 and D2) is transferred to the object device in the order of PDB[31:16]→LAT3→BD3*a*→IDB[31:16] while the lower part data (D1 and D0) is transferred in the order of PDB[15:0]→LAT4→BD4→IDB[15:0], thereby the data is written in the data register of the DMAC 3.

Figure 12:
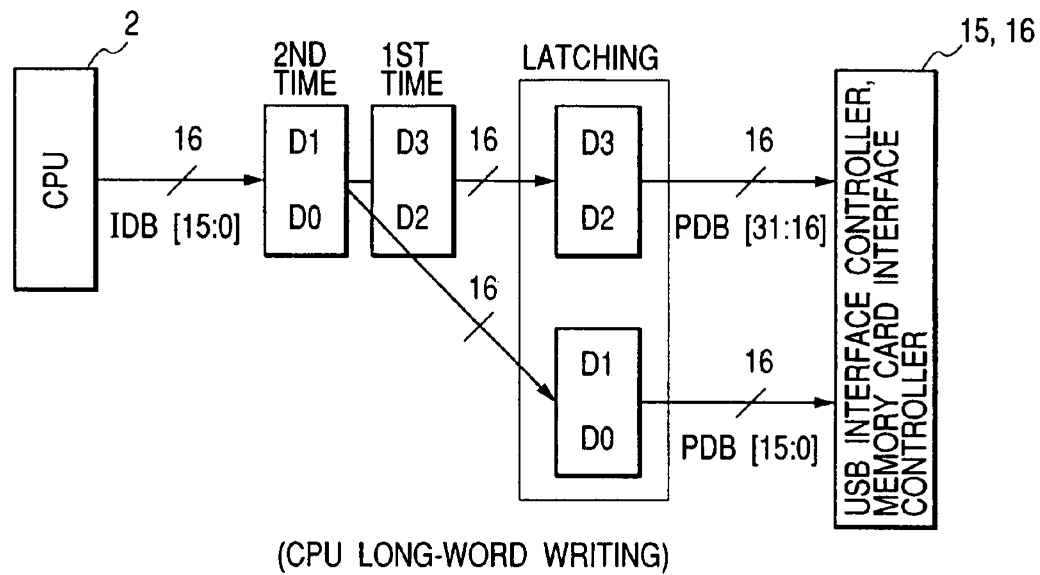
FIG. 12 is a chart for describing how a bus bridge is controlled when a CPU accesses a USB interface controller or memory card interface controller to write long-word data therefrom.
Figure 13:
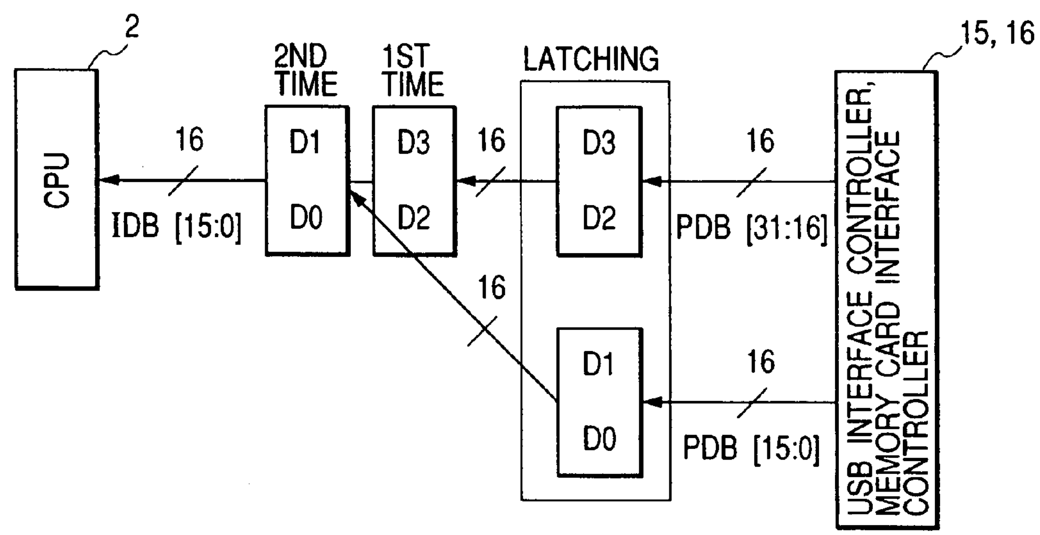
FIG. 13 is a chart for describing how a bus bridge is controlled when a CPU accesses a USB interface controller or memory card interface controller to read long-word data therefrom.

FIG. 12 shows how the bus bridge is controlled when long-word data is written from the CPU 2 in the USB interface controller 16 or memory card interface controller 15. FIG. 13 shows how the bus bridge is controlled when the CPU 2 reads long-word data from the USB interface controller 16 or memory card interface controller 15. At that time, the long-word access is divided into two word-accesses, since the CPU 2 inputs/outputs parallel data in units of 16 bits.

When in a write access, the upper part data (D3 and D2) is transferred to the object device in the order of IDB[15:0]→SDL1→LAT1 at the first access by the CPU 2 and the data is written once in the latch circuit LAT1. At the second access by the CPU 2, the lower part data (D1 and D0) is transferred to the object device in the order of IDB[15:0]→LAT2→BD2→PDB[15:0]. At the same time, the latched upper part data (D3 and D2) is transferred to the object device in the order of LAT1→BD1→PDB[31:0], thereby the data D3 to D0 is written in the data register of the USB interface controller 16 or memory card interface controller 15.

When in a read access, the upper part data (D3 and D2) is transferred to the object device in the order of PDB[31:16]→LAT3→BD3*b*→IDB[15:0] at the first access by the CPU 2. At the same time, the lower part data (D1 and D0) is transferred to the object device in the order of PDB[15:0]→LAT4. The data is latched once in the latch circuit LAT4. Then, at the second access by the CPU 2, the latched lower part data (D1 and D0) is transferred to the object device in the order of LAT4→BD4→IDB[15:0]. At the second read operation, the data D3 to D0 is read by the CPU 2.

Because such a bus bridging mechanism is employed, the data transfer between the USB interface controller 16 and the memory card interface controller 15 is speeded up with use of the 32-bit data buses 31D and 32D. In addition, such controlling operations as polling of various flags and writing of setting bits assigned to the registers of the USB interface controller 16 and the memory card interface controller 15 are executed in the 16-bit CPU 2 connected to the 16-bit bus IDB[15:0], thereby the power consumption of the CPU 2 in the active state can be reduced.

If the data processor 1 is employed as a bridge circuit provided between such a general-purpose bus as the USB bus 50 and such a storage device as the memory card 53, the power consumption of the data processor 1 can be reduced in the standby state. The data processor 1 also makes it possible to speed up the data transfer and reduce the power consumption in the active state.

While the preferred embodiment of the present invention has been described, it is to be understood that modifications will be apparent to those skilled in the art without departing from the spirit of the invention.

For example, the general-purpose bus may not conform to the USB version 2.0 standard; it may conform to another USB version, another standard such as the ISA bus. In addition, the storage device may not be a memory card. Even when it is a memory card, the memory card may be a non-memory card such as a flash memory card or a volatile memory card. It may also be a card type hard disk drive.

The bus bridging mechanism is not limited only to a bridge circuit provided between a general-purpose bus and a storage device; it may be any of other various types of bridge circuits.

The correspondence between the number of parallel data I/O bits of both interface controller and data transfer controller and that of the CPU is not limited only to 32 bits and 16 bits. To support faster data transfer, it may also possible to set the former at 64 bits and the latter at 16 bits, as well as the former at 128 bits and the latter at 32 bits.

The non-volatile memory may not be a flash memory; it may be a high dielectric material. The binary storage used to store information in each non-volatile memory cell may be another multi-level storage, such as the quaternary one.

The data processor on-chip module may not be the data processor described above; it may be another as needed. The data processor 1 can rewrite the data in the on-chip flash memory 4. For example, although the SCI 12 is mounted on the chip so as to input data to be rewritten and a control program for rewriting, it may be replaced with another interface. In addition, the on-chip logic may be expanded significantly into a system LSI.

The internal bus to which the CPU is connected may not be located at the downstream of the CLU; it may be located at the upstream of the CPU. Whether to employ the downstream connection or upstream connection may be decided by whether the big endian type is employed or the little endian type is employed for the data disposition in addresses.

While a description has been made for an embodiment in which the present invention is mainly applied to a bridge circuit of a lap-top PC in the field of the invention, the present invention is not limited only to the embodiment; it may apply to such a portable terminal as a PDA (Personal Data Assistant), further to any of other data processing systems widely.

The effects to be obtained by typical aspects of the present invention disclosed in this document will be able to be summarized as follows.

It is possible to realize low power consumption in the semiconductor data processing device used in a bridge circuit at the standby time.

It is possible to realize low power consumption in the semiconductor data processing device used in a bridge circuit at the operation time while assuring fast interfacing.

It is possible to realize low power consumption in the semiconductor data processing device used in a bridge circuit at the standby time and at the interfacing time.

What is claimed is:

1. A semiconductor data processing device, comprising:

a first peripheral circuit that inputs and outputs parallel data in units of 2n bits;

a second peripheral circuit that inputs and outputs parallel data in units of 2n bits;

a data transfer controller capable of controlling data transfer between the first and the second peripheral circuits and that inputs and outputs data in parallel in units of 2n bits;

a 2n-bit first data bus coupled to the data transfer controller;

a 2n-bit second data bus coupled to the first and the second peripheral circuits;

a bus controller for connecting said first data bus to said second data bus; and a central processing unit that processes parallel data in units of n bits or less, coupled to one of a lower and an upper part of said first data bus, wherein the bus controller fixes the correspondence between each signal line of the second bus and a bit position of access data and varies the correspondence between each signal line of the first data bus and bit positions of the access data according to access data size.

2. A semiconductor data processing device according to claim 1, wherein the first peripheral circuit comprises a USB controller.

3. A semiconductor data processing device according to claim 2, wherein the second peripheral circuit comprises a memory card controller.

4. A semiconductor data processing device according to claim 1, wherein the second peripheral circuit comprises a memory card controller.

5. A semiconductor data processing device according to claim 1, wherein the semiconductor data processing device is located on one semiconductor chip.

6. A single chip data processing device, comprising:

a first peripheral circuit that inputs and outputs parallel data in units of 2n bits;

a second peripheral circuit that inputs and outputs parallel data in units of 2n bits;

a 2n-bit first data bus;

a 2n-bit second data bus;

a data transfer controller that inputs and outputs data in parallel in units of 2n bits and is capable of controlling data transfer between the first peripheral circuit and the second peripheral circuit;

a bus controller coupled to the 2n-bit first data bus and to the 2n-bit second data bus; and a central processing unit that processes parallel data in units of n bits or less, and is coupled to one of a lower and an upper part of the 2n-bit first data bus, wherein the first and the second peripheral circuits are coupled to the 2n-bit second data bus, and wherein the bus controller fixes the correspondence between each signal line of the 2n-bit second bus and a bit position of access data and varies the correspondence between each signal line of the 2n-bit first data bus and bit positions of the access data according to access data size.

7. A single chip data processing device according to claim 6, wherein the first peripheral circuit comprises a USB controller.

8. A single chip data processing device according to claim 7, wherein the second peripheral circuit comprises a memory card controller.

9. A single chip data processing device according to claim 6, wherein the second peripheral circuit comprises a memory card controller.

10. A single chip data processing device according to claim 6, wherein the single chip data processing device is contained on a semiconductor substrate.

11. A semiconductor data processing device, comprising:

a first peripheral circuit that inputs and outputs parallel data in units of 2n bits;

a second peripheral circuit that inputs and outputs parallel data in units of 2n bits;

a direct memory access controller capable of controlling data transfer between the first and the second peripheral circuits and that inputs and outputs data in parallel in units of 2n bits;

a 2n-bit first data bus coupled to the data transfer controller;

a 2n-bit second data bus coupled to the first and the second peripheral circuit, respectively;

a bus controller for connecting said first data bus to said second data bus; and a central processing unit that processes parallel data in units of n bits or less, coupled to one of a lower and an upper part of said first data bus, wherein the bus controller fixes the correspondence between each signal line of the second bus and a bit position of access data and varies the correspondence between each signal line of the first data bus and bit positions of the access data according to access data size.

12. A semiconductor data processing device, comprising:

a first peripheral circuit that inputs and outputs data in units of n bits;

a second peripheral circuit that inputs and outputs parallel data in units of 2n bits;

a data transfer controller capable of controlling data transfer between the first and the second peripheral circuits and that inputs and outputs data in parallel in units of 2n bits;

a 2n-bit first data bus coupled to the data transfer controller;

a 2n-bit second data bus coupled to the first and the second peripheral circuits;

a bus controller for connecting said first data bus to said second data bus; and a central processing unit that processes parallel data in units of n bits or less, coupled to one of a lower and an upper part of said first data bus, wherein the bus controller fixes the correspondence between each signal line of the second bus and a bit position of access data of the second peripheral circuit and varies the correspondence between each signal line of the second data bus and bit positions of the access data of the first peripheral circuit according to access data size and varies the correspondence between each signal line of the first data bus and bit positions of the access data according to access data size.

13. A semiconductor data processing device, comprising:

a first peripheral circuit that inputs and outputs data in units of n bits;

a second peripheral circuit that inputs and outputs parallel data in units of 2n bits;

a data transfer controller capable of controlling data transfer between the first and the second peripheral circuits and that inputs and outputs data in parallel in units of 2n bits;

a 2n-bit first data bus coupled to the data transfer controller;

a 2n-bit second data bus coupled to the first and the second peripheral circuits;

a bus controller for connecting said first data bus to said second data bus; and a central processing unit that processes parallel data in units of n bits or less, coupled to one of a lower and an upper part of said first data bus, wherein the bus controller fixes the correspondence between each signal line of the second bus and a bit position of access data of the first peripheral circuit and varies the correspondence between each signal line of the second data bus and bit positions of the access data of the second peripheral circuit according to access data size and varies the correspondence between each signal line of the first data bus and bit positions of the access data according to access data size.

* * * * *